A. BOX.
Screw-Hoisting Pulley-Apparatus.
No. 199,955. Patented Feb. 5, 1878.
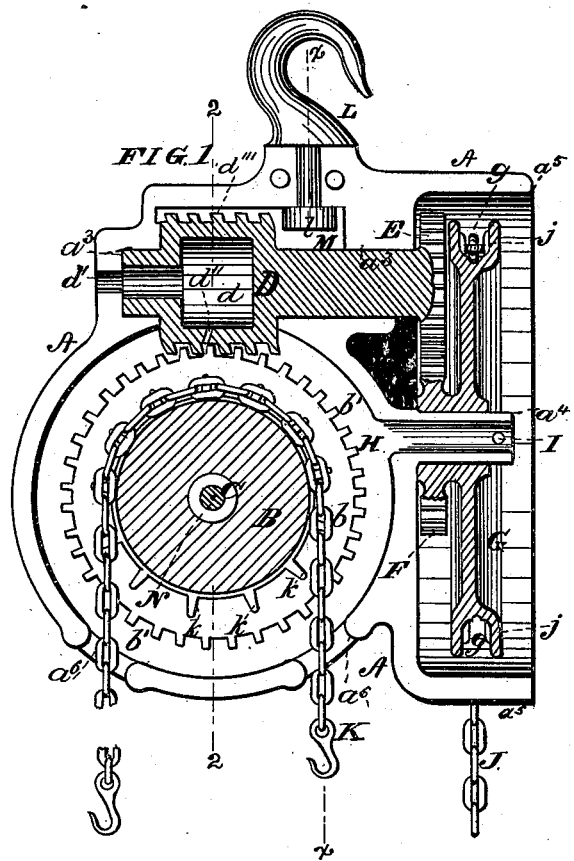

UNITED STATES PATENT OFFICE.

ALFRED BOX, OF PHILADELPHIA, PENNSYLVANIA.

IMPROVEMENT IN SCREW HOISTING-PULLEY APPARATUS.

Specification forming part of Letters Patent No. 199,955, dated February 5, 1878; application filed November 12, 1877.

*To all whom it may concern:*

Be it known that I, ALFRED BOX, of Philadelphia, in the State of Pennsylvania, have invented new and useful Improvements in Screw Hoisting-Pulley Apparatus, of which the following is a specification:

My invention relates to a screw hoisting apparatus in which the casing or box furnishes bearings for the carrying-wheel.

My improvement consists, first, in constructing the operating-screw hollow, so as to render the machine lighter, and at the same time furnish a chamber for the reception of lubricating material.

My improvement consists, secondly, in providing gear-wheels between the hand chain-wheel and operating-screw, by which I can use a hand chain-wheel of less diameter.

My improvement consists, thirdly, in a combined worm-wheel and chain-sheave, of such construction as to permit the chain to pass beneath the operating-screw and between the flanges of the wheel.

My improvement consists, fourthly, in constructing the casing or box with a rim for protecting the hand chain-wheel from accident.

My improvement consists, fifthly, in constructing the rim of such diameter as to prevent the chain from leaving the wheel, and at the same time forming a guard to the wheel.

My improvement consists, sixthly, in constructing the worm-wheel casing with a stud to receive the hand chain-wheel.

My improvement consists, seventhly, in a box or casing divided through the center perpendicularly, to permit of the ready removal or insertion of the hoisting apparatus.

My improvement consists, eighthly, in constructing the casing or box of the lifting chain-wheel with chain-openings of such a shape and size as to prevent the chain from leaving the wheel.

My improvement consists, ninthly, in constructing the rim for the hand chain-wheel with openings of such a shape and size as to prevent the chain from leaving the wheel when being moved from place to place.

In the accompanying drawings, Figure 1 is a vertical section of my improved screw hoisting-pulley apparatus on the line 1 1, Fig. 2. Fig. 2 is a vertical section on the line 2 2, Fig. 1.

A is the box or casing, consisting of castings $a\ a^1$. This casing is formed with bearings $a^2$, for the worm-wheel hub C of a combined worm-wheel and chain-sheave, B. D is the operating-screw, constructed with a hollow portion or chamber, $d$, for lubricant, and turning in bearings $a^3$, also formed in the box A. One end of the screw D is constructed or provided with a gear-wheel, E, turned by another gear-wheel, F, constructed in one piece with, or bolted to, the hand chain-wheel G, both wheels, F and G, being mounted on a stud, $a^4$, formed on the worm-wheel casing H, and secured by a key, I. The casing or box A is constructed with a rim, $a^5$, adapted to form a chamber or receptacle for the hand chain-wheel and intermediate gearing to the operating-screw, to protect them from any obstruction, and, when made of suitable diameter, also forms a guard to prevent the chain from leaving the hand-wheel.

The hand-chain J works in a groove, $g$, in the wheel G, and revolves the latter by engaging with projections or sprockets $j$ in said groove. The combined worm and chain wheel B is provided with a deep groove, $b$, and sprockets $k$ for the hoisting-chain K to engage with, so that the chain passes beneath the operating-screw, which meshes with cogs $b$ on the flanges $b''\ b''$ of the wheel.

The supporting-hook L is swiveled to the top of the casing, its head $l$ being securely held within a recess, M, formed in the screw-chamber $d'''$. The hollow portion of the screw is provided with an opening, $d'$, for the insertion of the lubricant, and an orifice, $d''$, to permit the lubricant to pass to the teeth of the worm-wheel.

The castings $a\ a^1$ are secured together by means of bolts N and O, the bolt N passing through the hub C of the wheel, and secured by nuts $n\ n$, and the bolts O passing through the upper part of the case, and secured by nuts $o\ o$.

The line $x\ x$ in Fig. 1 shows the pitch-line of chain and center of gravity of the machine, the machine being evenly balanced from the hook L.

$a^6\ a^6$ are openings for the hoisting or lift chain, and $a^7\ a^7$ openings in the rim for the hand-chain. These openings $a^6\ a^6\ a^7\ a^7$ are in such a position and of such a shape as to guide and hold their chains in line with their respective wheels, whatever position the apparatus may be placed in.

It is evident that by the use of intermediate gears between the hand-wheel and screw I can increase or decrease the power and speed of the machine. I can also use a much smaller hand-wheel, and place it in such position as to be out of the way in handling, and avoid the risk of breaking it.

By dividing the case in the manner described it obviates the necessity of keys or set-screws to hold wheels and shafts. The wheels can be made solid, and laid in one-half of the case; then the other half of case is bolted on, and the machine is ready for use.

The hook L is held by its head, the shank passing between the two sections of the casing, so as to allow of the hook being removed or replaced when necessary. By applying the hook in this manner riveting or keying is dispensed with.

Having thus described my invention, the following is what I claim as new and desire to secure by Letters Patent:

1. In a screw hoisting apparatus, a hollow screw, D $d$, as and for the purpose set forth.

2. In a screw hoisting-pulley apparatus, the gear-wheels E F, intermediate of hand chain-wheel G, and screw D, as and for the purpose set forth.

3. The combined worm-wheel and chain-sheave B, as and for the purpose set forth.

4. A box or casing constructed with a rim, $a^5$, adapted to form a chamber for the hand chain-wheel, as and for the purpose set forth.

5. In a screw hoisting-pulley apparatus, the combination, with the hand chain-wheel G and intermediate gear-wheels, of the rim $a^5$, acting as a guard to prevent the chain from leaving the wheel, as and for the purpose set forth.

6. The worm-wheel casing H, constructed with a stud, $a^4$, to receive the hand chain-wheel G, as and for the purpose set forth.

7. A screw hoisting apparatus having its box or casing A centrally and perpendicularly divided, $a\ a^1$, to permit the insertion and removal of the hoisting devices, as and for the purpose set forth.

8. The combination, with the worm-wheel and lifting-chain, of the casing A, constructed with openings $a^6\ a^6$, adapted to keep the chain in line with the wheel, as and for the purpose set forth.

9. The combination, with the hand chain and wheel, of the rim $a^5$, having openings $a^7\ a^7$ for guiding the chain in the manner described, and for the purpose set forth.

ALFRED BOX.

Witnesses:
THEO. F. SCOTT,
JOHN E. ROBERTS.